United States Patent
Grohs et al.

(10) Patent No.: US 6,550,858 B1
(45) Date of Patent: Apr. 22, 2003

(54) EXTRICABLE SEAT ASSEMBLY

(75) Inventors: Theodore M. Grohs, Royal Oak, MI (US); Walter T. Cichocki, Howell, MI (US); Charles D. Winton, Lincoln Park, MI (US); Robert M. Hobbes, Allen Park, MI (US); Robert J. Niester, Warren, MI (US)

(73) Assignee: Lear Corporation, Southfield, MI (US)

( * ) Notice: Subject to any disclaimer, the term of this patent is extended or adjusted under 35 U.S.C. 154(b) by 89 days.

(21) Appl. No.: 09/667,494

(22) Filed: Sep. 21, 2000

(51) Int. Cl.[7] ................................................. B60N 2/42
(52) U.S. Cl. .............................. 297/216.1; 297/452.28; 297/452.33
(58) Field of Search ....................... 297/452.29, 452.33, 297/452.28, 452.23, 452.24, 216.1, 216.12, 216.13, 216.14, 216.15, 440.1, 440.22, 440.2; 29/428

(56) References Cited

U.S. PATENT DOCUMENTS

| | | |
|---|---|---|
| D166,397 S | 4/1952 | Komai |
| 2,660,222 A | 11/1953 | Woodsworth |
| 2,736,566 A | 2/1956 | Hartl |
| 3,165,355 A | 1/1965 | Hitchcock, Jr. et al. |
| 3,357,736 A | 12/1967 | McCarthy |
| 3,420,572 A * | 1/1969 | Bisland |
| 3,578,376 A | 5/1971 | Hasegawa et al. |
| 3,610,679 A | 10/1971 | Amato |
| 3,627,379 A | 12/1971 | Faust |
| 3,628,832 A | 12/1971 | Jennings |
| 3,632,166 A | 1/1972 | Lohr |
| 3,740,096 A | 6/1973 | Bridger |
| D234,033 S | 1/1975 | Tarbet |
| 3,922,034 A | 11/1975 | Eggert |
| 3,966,146 A | 6/1976 | Roberts |
| 3,998,291 A | 12/1976 | Davis |
| 4,092,751 A | 6/1978 | Burkholder et al. |
| 4,189,182 A * | 2/1980 | Rhoe |
| 4,301,983 A | 11/1981 | Horan |
| 4,311,335 A | 1/1982 | Winiecki |
| 4,327,931 A | 5/1982 | Winiecki |

(List continued on next page.)

Primary Examiner—Milton Nelson, Jr.
(74) Attorney, Agent, or Firm—Bill C. Panagos

(57) ABSTRACT

An extricable seat assembly attachable to a cockpit of a vehicle is configured to allow a driver to be supported in an outstretched position and to allow removal of portions of the seat assembly. The seat assembly generally includes a bottom portion to support the lower torso of the driver, a back portion to support the spinal column of the driver, a left portion to support the left paraspinal area of the driver, and a right portion to support the right paraspinal area of the driver. The bottom portion has a hingedly connectable upper edge. The back portion has a lower edge hingedly and detachably connected to the upper edge of the bottom portion. The back portion further has hingedly connectable left and right edges.

34 Claims, 7 Drawing Sheets

U.S. PATENT DOCUMENTS

| | | | |
|---|---|---|---|
| 4,568,102 A | | 2/1986 | Dauvergne |
| 4,572,578 A | | 2/1986 | Perkins |
| D283,469 S | | 4/1986 | Zimmerman |
| D283,470 S | | 4/1986 | Zimmerman |
| 4,592,587 A | * | 6/1986 | Cousins et al. |
| 4,615,856 A | * | 10/1986 | Silverman |
| 4,753,482 A | * | 6/1988 | Warren |
| 4,856,846 A | | 8/1989 | Lohmeyer |
| 4,883,243 A | | 11/1989 | Herndon |
| 4,883,320 A | | 11/1989 | Izumida et al. |
| 4,923,147 A | | 5/1990 | Adams et al. |
| 4,960,304 A | * | 10/1990 | Frantz |
| D321,992 S | | 12/1991 | Butler |
| 5,163,737 A | * | 11/1992 | Navach |
| D341,038 S | | 11/1993 | Danko |
| 5,286,083 A | | 2/1994 | Mattison |
| D344,641 S | | 3/1994 | Bruns et al. |
| 5,513,897 A | | 5/1996 | Lemmen |
| 5,556,169 A | | 9/1996 | Parrish et al. |
| 5,577,811 A | | 11/1996 | Ogg |
| 5,722,102 A | | 3/1998 | Summers |
| 5,722,719 A | | 3/1998 | Glomstad |
| 5,806,910 A | | 9/1998 | DeRees |
| 5,810,417 A | | 9/1998 | Jesadanont |
| 5,845,967 A | | 12/1998 | Kane et al. |
| 5,855,411 A | | 1/1999 | Inoue |
| 5,934,749 A | | 8/1999 | Pond et al. |
| 5,947,515 A | | 9/1999 | Fitch |
| D422,154 S | | 4/2000 | Lieberman et al. |
| 6,139,109 A | * | 10/2000 | Lajoie |
| 6,336,681 B1 | * | 1/2002 | Crosbie |

* cited by examiner

EXTRICABLE SEAT ASSEMBLY

TECHNICAL FIELD

The present invention relates to a multi-layered extricable seat assembly attachable to a cockpit of a racing vehicle for a driver of the vehicle.

BACKGROUND ART

The demand to improve driver safety and protection in vehicles, especially in racing vehicles, continues to grow. Race cars, such as Formula-I vehicles, require careful engineering to balance vehicle performance and driver safety. A major focus of maintaining and increasing driver safety is structurally improving the seat and cockpit in which a driver rests.

Engineers and designers of race car seats and passenger vehicle seats are especially challenged in improving seat design to accommodate protection to the driver and passenger(s) of a vehicle during an impact event or crash, and to accommodate the handling and stabilizing of the driver after the crash. In many circumstances, emergency response teams have experienced difficulty in handling an injured driver after an impact event. In an event of a vehicle impact wherein the driver is injured, safety belts and/or harnesses are removed from the driver whom then is manually lifted out of the seat, transported on a support surface, and extended thereon such that the driver lies flat. During extrication from the seat, the driver is supported by emergency response members for safe handling. However, there are situations in which the driver may have experienced an injury requiring extreme care by the emergency response members in handling the driver, such as in a spinal injury situation. In such situation, the extrication described above can be improved to accommodate better handling and stabilizing of the driver.

Moreover, improvements to the seat can be made to easily fit into the cockpit of the vehicle while accommodating the body shape of the driver. The cockpit of a vehicle typically has a seat installed therein which is formed to fit the shape of the cockpit. The seat, on the other hand, does not substantially conform to complement the body shape of the driver when resting thereon. As a result, additional materials and cushions are installed to conform to the body shape of the driver. Without such installation of materials and cushions thereon, undesirable chronic shifting of the driver's body occurs during operation of the race car, affecting the driver's performance, endurance, safety, and comfort. Currently, the installation of additional materials and cushions is very time consuming and labor intensive.

Thus, what is needed is an improved extricable seat assembly which overcomes the problems stated above.

What is also needed is an extricable seat assembly that provides improved protection to the driver during an impact incident and provides improved safe handling and stabilizing of a driver after an impact event.

What is also needed is an extricable seat assembly which is formed to fit into a cockpit of a racing vehicle and complements the shape of a driver's body.

DISCLOSURE OF INVENTION

An object of the present invention is to provide for an improved extricable seat assembly attachable to a cockpit of a vehicle for a driver of the vehicle. The seat assembly generally comprises a bottom portion, a back portion, a left portion and a right portion. The bottom portion supports the lower torso and the upper legs of the driver and has a hingedly connectable upper edge. The back portion supports the spinal column of the driver and has a lower edge hingedly and detachably connected to the upper edge of the bottom portion. The back portion has hingedly connectable left and right edges. The left portion supports the left paraspinal area of the driver and has a lower edge hingedly and detachably connected to the upper edge of the bottom portion. The left portion also has a right edge hingedly and detachably connected to the left edge of the back portion. The right portion supports the right paraspinal area of the driver and has a lower edge hingedly and detachably connected to the upper edge of the bottom portion. The right portion also includes a left edge hingedly and detachably connected to the right edge of the back portion. In the event of an impact, the seat assembly allows an outstretched position of the driver such that the driver rests substantially coplanar with a support for post extrication handling of the driver. The seat assembly also allows removal of portions of the seat assembly from the driver.

In another embodiment of the present invention, the seat assembly comprises a common outer layer, a custom-formed integral inner layer, and an impact energy material. The common outer layer has a first surface and a second surface attachable to the cockpit of the vehicle. The common outer layer is formed to be received in the cockpit. The custom-formed integral inner layer is formed to complement the shape of the body of the driver. The inner layer is press-fit attached only at its periphery to the first surface of the outer layer, defining a void between the inner and outer layers. The impact energy material is disposed in the void between the inner and outer layers to adhere the inner and outer layers for support of the driver when in the seat assembly.

In another embodiment, the present invention includes a multi-layered extricable seat assembly attached to a cockpit of a racing vehicle for a driver of the vehicle. The seat assembly includes a bottom portion to support the lower torso of the driver, a back portion to support the spinal column of the driver, a left portion to support the left paraspinal area of the driver, and a right portion to support the right paraspinal area of the driver. The bottom portion has a hingedly connectable upper edge. The back portion has a lower edge hingedly and detachably connected to the upper edge of the bottom portion and hingedly connectable left and right edges. The left portion has a lower edge hingedly and detachably connected to the upper edge of the bottom portion and a right edge hingedly and detachably connected to the left edge of the back portion. The right portion has a lower edge hingedly and detachably connected to the upper edge of the bottom portion and a left edge hingedly and detachably connected to the right edge of the back portion. Each portion includes a common outer layer, a custom-formed integral inner layer, and a liner. The common outer layer is attachable to the cockpit of the racing vehicle and is formed to be received in the cockpit. The custom-formed integral inner layer is formed to complement the shape of the body of the driver. The inner layer is press-fit attached only at its periphery to the outer layer, defining a void between the inner and outer layers. The liner is disposed in the void between the inner and outer layers to support the driver in the seat assembly.

It is yet another object of the present invention to provide an improved method of manufacturing an extricable seat assembly attachable to a cockpit of a vehicle for a driver of the vehicle. The method includes providing a common outer layer having a first surface and a second surface attachable to the cockpit of the vehicle and a custom-formed integral inner layer formed to complement the shape of the body of the driver. The method further includes contacting the inner layer onto the first surface of the outer layer only at peripheries of the layers to define a void between the inner and outer layers. The method further includes injecting an impact energy material or liner material at a first temperature in the void between the inner and outer layers to support the driver when in the seat assembly and settling the layers and the material for a time period to enable adherence of the layers and solidification for rigidity of the impact energy material.

It is still another object of the present invention to provide an improved method of extricating a driver on an extricable seat assembly of a cockpit of a vehicle after an impact event. The method includes providing the seat assembly on which the driver is to be seated. The seat assembly includes a bottom portion with a connectable upper edge, a back portion connected to the upper edge of the bottom portion and having connectable left and right edges, a left portion connected to the upper edge of the bottom portion and connected to the left edge of the back portion, and a right portion connected to the upper edge of the bottom portion and connected to the right edge of the back portion. The method further includes lifting the driver and the seat assembly after the impact event and placing the driver and the seat assembly on a support. The method then includes detaching the bottom portion from the back portion, left portion, and right portion to lower the legs of the driver in an outstretched position and detaching the left and right portions from the back portion to outstretch the upper torso of the driver, thereby supporting the driver with the back portion.

BEST MODE FOR CARRYING OUT THE INVENTION

Figure 1:
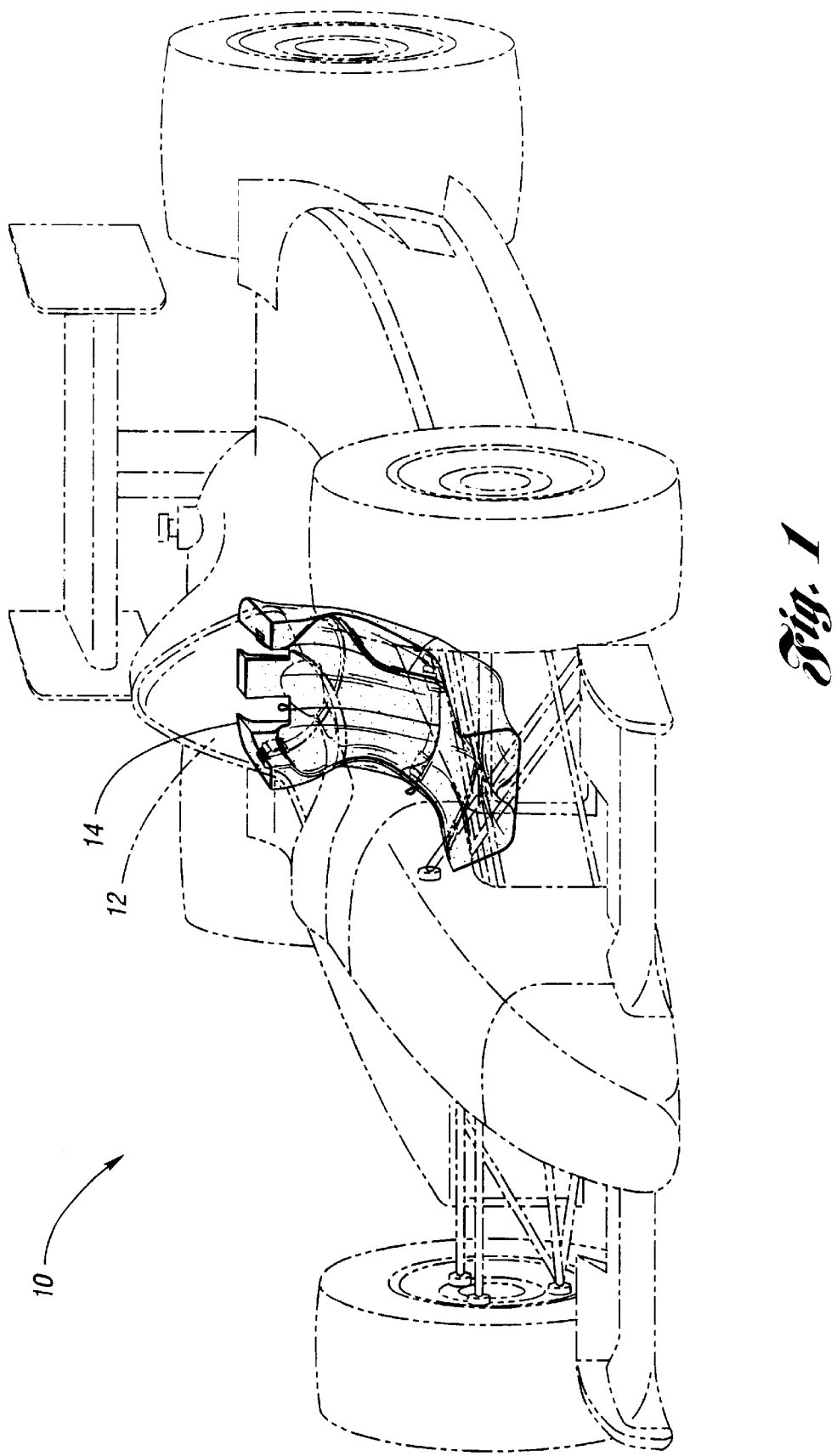
FIG. 1 is an environmental view of one embodiment of a seat assembly attachable to a cockpit of a racing vehicle in accordance with the present invention.
Figure 2:
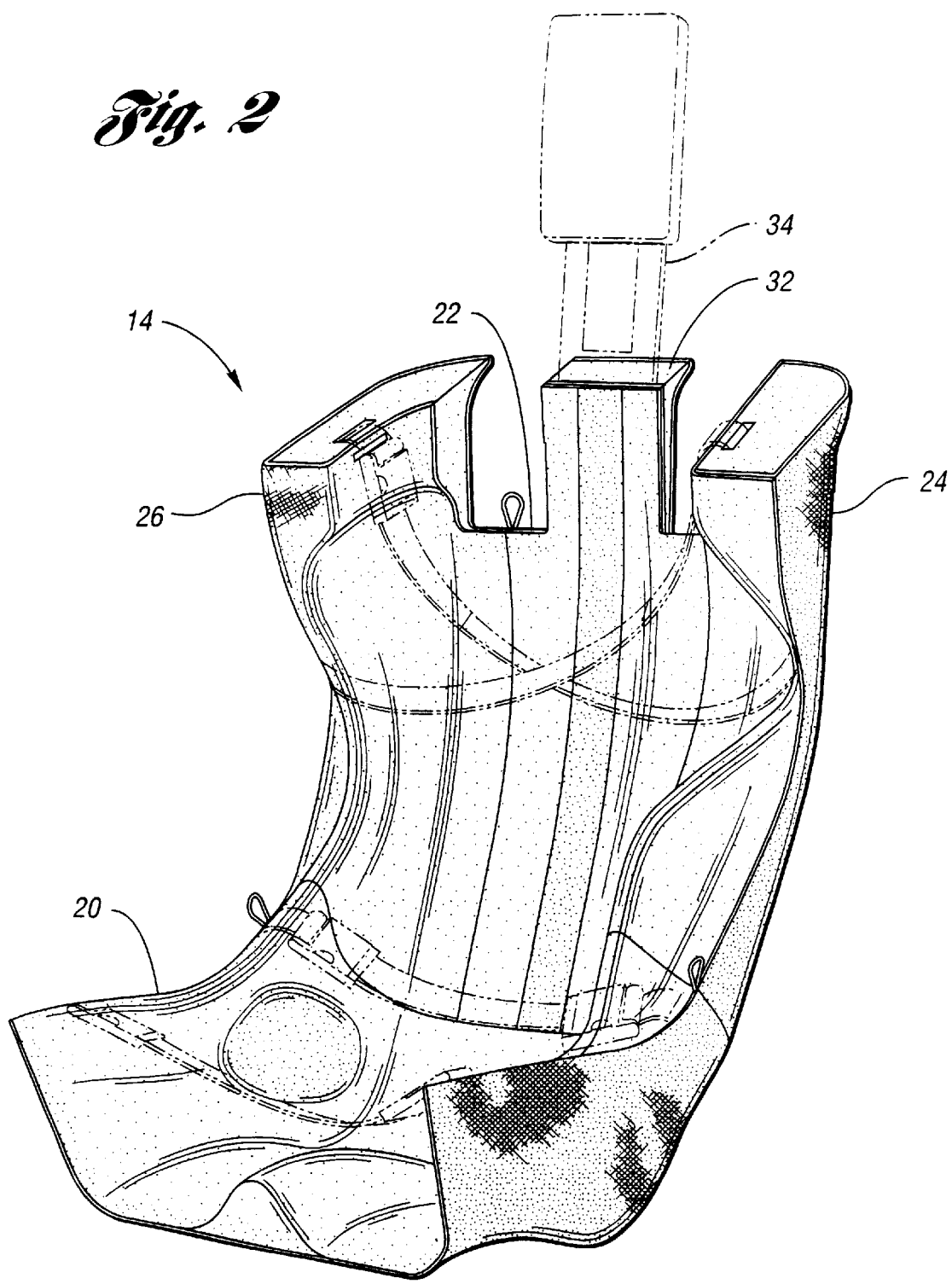
FIG. 2 is a perspective view of the seat assembly of FIG. 1 depicting portions which define the seat assembly.
Figure 3:
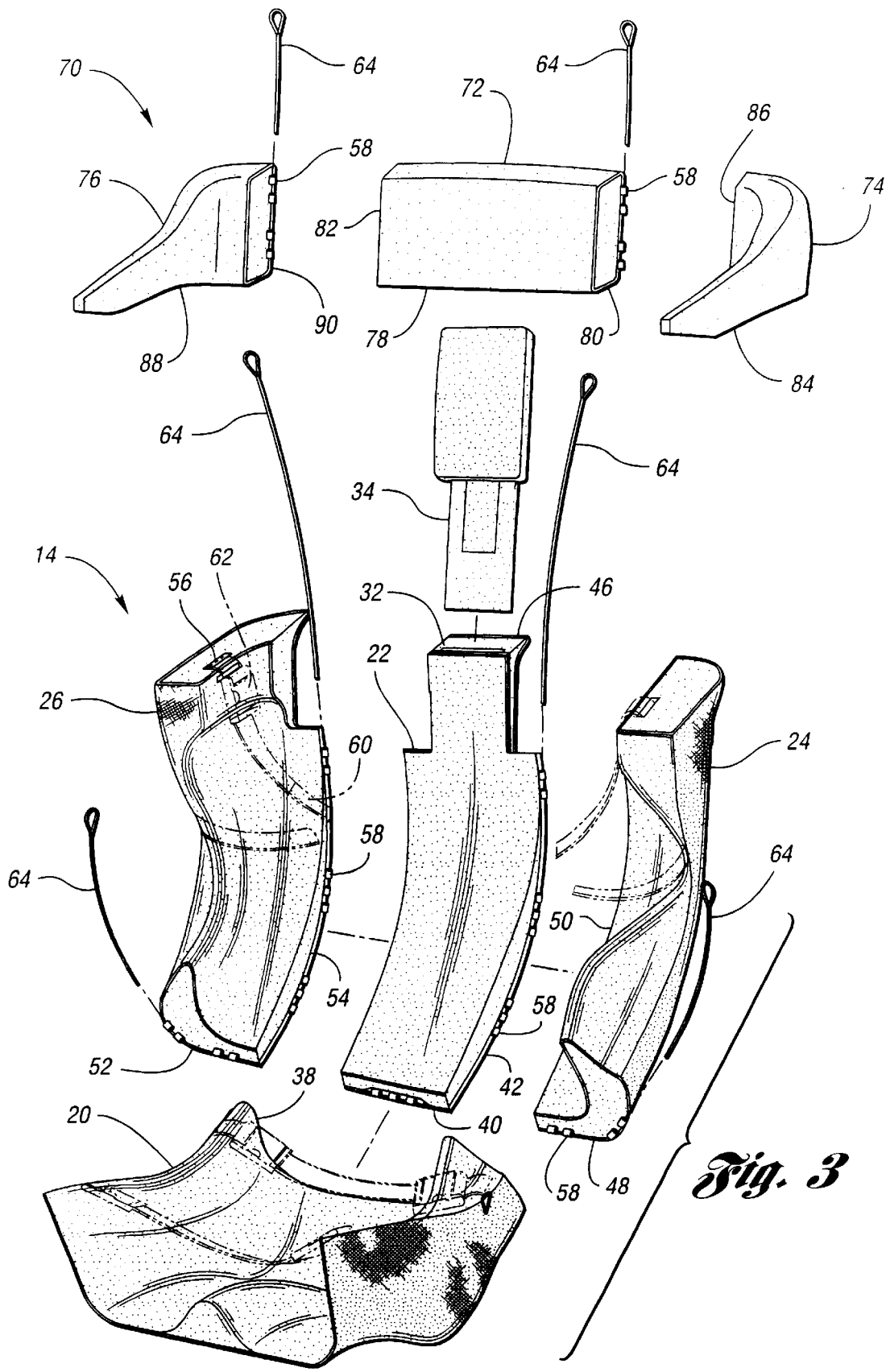
FIG. 3 is an exploded view of the seat assembly of FIG. 2.

FIG. 1 illustrates an environmental view of a racing vehicle 10 having cockpit 12 in which extricable seat assembly 14 is disposed. In an event of a crash or high impact occurrence, the driver and seat assembly 14 may be removed or lifted from the cockpit 12 or from any other surface on which the assembly 14 is positioned. With the driver intact, seat assembly 14 is configured to be removed or lifted even with heavy force and movement of an extrication while maintaining spinal support to the driver. It is to be noted that the cockpit described herein is a cockpit of a Formula-I racing vehicle, but may include cockpits of other racing vehicles and compartments of passenger vehicles. As shown in FIG. 2, seat assembly 14 generally includes a bottom portion 20 to support the lower torso and legs of the driver, back portion 22 to support the spinal column of the driver, left portion 24 to support the left paraspinal area of the driver, and right portion 26 to support the right paraspinal area of the driver. As depicted in FIG. 3, bottom portion 22 has a hingedly connectable upper edge 38 to which back portion 22, left portion 24, and right portion 26 hingedly connect as described in greater detail below. Back portion 22 includes lower edge 40 which hingedly and detachably connects to upper edge 38 of bottom portion 20. Back portion 22 further includes hingedly connectable left and right edges 42, 44.

As shown in FIG. 3, left portion 24 includes lower edge 48 which hingedly and detachably connects to upper edge of bottom portion 20. Left portion 24 further includes right edge 50 which hingedly and detachably connects to left edge 42 of back portion 22. Thus, left portion 24 is disposed adjacent bottom and back portions 20, 22, as shown. Right portion 26 includes lower edge 52 which hingedly and detachably connects to upper edge 38 of bottom portion 20. Right portion 26 further includes left edge 54 which hingedly and detachably connects to right edge 44 of back portion 22. Thus, right portion 26 is disposed adjacent bottom and back portions 20, 22 and opposite left portion 24. Although the portions mentioned above may be hingedly and detachably connected by any suitable means, a preferred way of hingedly and detachably connecting the portions together is by having hinges disposed on the edges mentioned above. The hinges have through-holes formed therethrough, each of which receive an elongated quick release cord or rod 64. As shown, each edge of each portion includes a plurality of hinges 58 through which one cord 64 is disposed.

In this embodiment, four cords 64 are implemented to hingedly and detachably connect the portions of seat assembly 14. At least one cord 64 is disposed through each of the hinges 58 of the lower edges of portions 22, 24, 26. The at least one cord 64 is also disposed through hinge 58 of upper edge 38 of bottom portion 20 to hingedly and detachably connect the lower edges of portions 22, 24, 26 to upper edge 38 of bottom portion 20. In this embodiment, two cords 64 are used to accomplish this. Another cord 64 is disposed through hinges 58 of right edge 50 of left portion 24 and left edge 42 of back portion 22. Thus, right edge 50 of left portion 24 is hingedly and detachably connected to left edge 42 of back portion 22. Yet another cord 64 is disposed through hinges 58 of left edge 54 of right portion 26 and right edge 44 of back portion 22, thus hingedly and detachably connecting left edge 54 of right portion 26 to right edge 44 of back portion 22. Although in this embodiment four cords are implemented, the number of cords used may vary without falling beyond the scope or spirit of this invention.

As shown in FIGS. 2 and 3, seat assembly 14 further includes apertures 56 through which belt 60 may be disposed to hold buckle 62. As shown in FIG. 3, back portion 22 further includes upper edge 46 having receiving slot 32 formed therethrough to receive head stabilizing board 34.

FIG. 3 further depicts head guard assembly 70 which minimizes rotation and lateral movement of the driver's head during operation of a racing vehicle and provides improved lateral and rear impact protection. The shape of head guard assembly 70 also increases the contact area behind the driver's head for improved rear impact protection. Head guard assembly 70 is removably attachable to the periphery of a cockpit of a racing vehicle. Head guard assembly 70 may be attached to the periphery of the cockpit by any conventional means. Preferably, head guard assembly 70 is press-fitted onto the periphery of the cockpit and secured thereto by threaded pins and nuts. As shown, head guard assembly 70 generally includes center part 72 which generally contacts the rear of the driver's head, left part 74 attachable to center part 72 to contact the left side of the driver's head for a reduced head rotation and lateral movement, and right part 76 attachable to center part 72 to contact the right side of the driver's head for reduced head rotation and lateral movement. Center part 72 includes lower edge 78 connectable to the cockpit and has hingedly connectable left and right edges 80, 82. Left part 74 has lower edge 84 connectable to the cockpit and has right edge 86 hingedly and detachably connected to the left edge 80 of center part 72. Right part 76 has lower edge 88 connectable to the cockpit and has left edge 90 hingedly and detachably connected to right edge 82 of center part 72.

In a preferred embodiment, parts 74 and 76 both include hinges similar to hinges located in seat assembly 14. That is, hinges 58 may be disposed on left and right edges 80, 82 of center part, right edge 86 of left part 74, and left edge 90 of right part 76. In this embodiment, two cords 64 are used to connect left and right parts 74 and 76 to center part 72, as used in seat assembly 14 described above.

Figure 4:
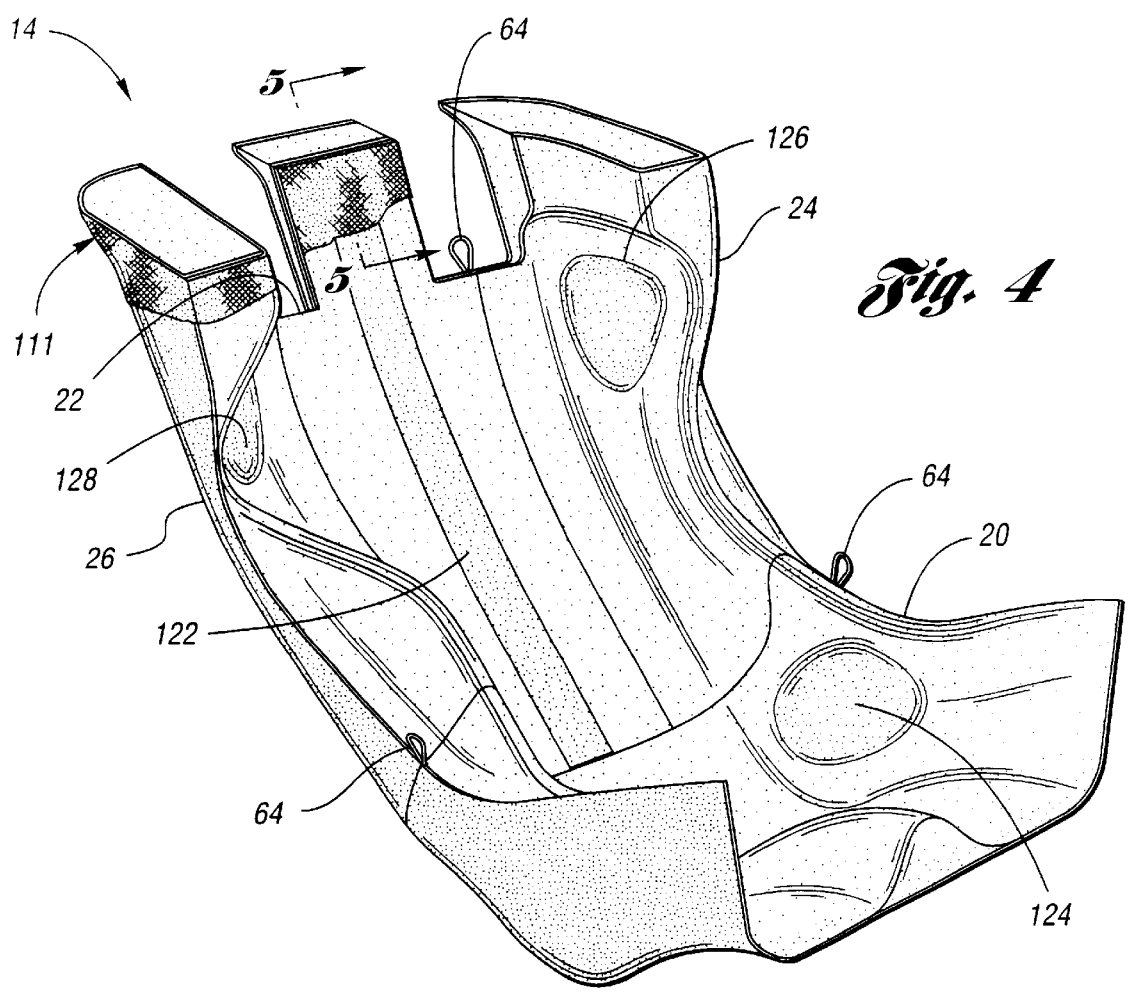
FIG. 4 is another perspective of the seat assembly of FIG. 1 depicting an outer layer, an inner layer peripherally attached to the outer layer, and impact energy material disposed therebetween.
Figure 5:
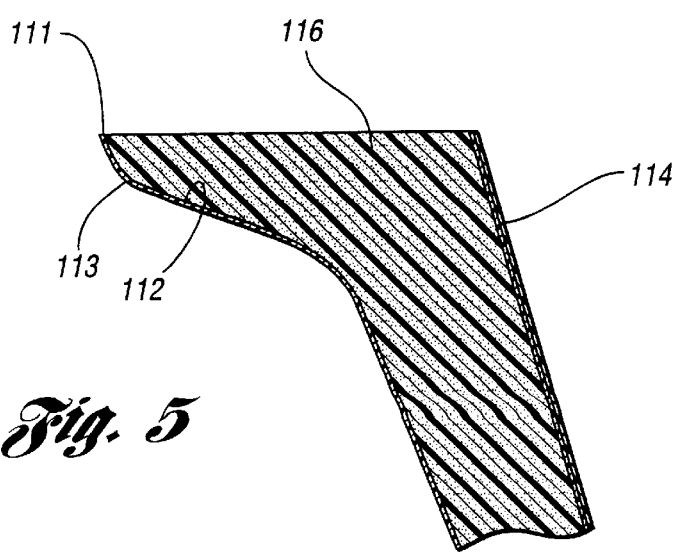
FIG. 5 is a cross-sectional view of the seat assembly of FIG. 4 taken along lines 5—5.

As depicted in FIGS. 4 and 5, seat assembly 14 includes a plurality of shells or layers to provide an easy fit into a cockpit of a racing vehicle, to accommodate a wide range of body shapes of drivers, and to provide protection to the driver upon a collision. Seat assembly 14 is a multi-layered extricable seat assembly which is attachable to a cockpit of a racing vehicle and custom-fitted for a range of different drivers of the vehicle. Seat assembly 14 generally includes common outer layer 111 having first surface 112 and second surface 113, custom-formed integral inner layer 114 press-fit attached only at is periphery to the first surface 112 of outer layer 111, and impact energy material 116 disposed between outer layer 111 and inner layer 114. Common outer layer 111 is formed to be received in the cockpit. Second surface 113 is configured to be attachable to and complement a shape of a cockpit of the racing vehicle. First surface 112 is configured to receive inner layer 114 at its periphery and for impact energy material 116 to be disposed therebetween.

Custom-formed integral inner layer 114 is formed to complement the shape of the body of the driver. Thus, when inner layer 114 is press-fit attached only at is periphery to first surface 112 of outer layer 111, a void is defined between outer and inner layers 111, 114. Impact energy material 116 is thus disposed in the void between outer and inner layers 111, 114 to provide protection to the driver during impact of a collision. Impact energy material 116 maintains adherence between outer and inner layers 111, 114 and supports the driver when in the seat assembly 14.

As shown, custom-formed integral inner layer 114 generally includes recesses 122, 124, 126 and 128. More specifically, inner layer 114 includes spinal recess 122 centrally formed vertically along back portion 22. As shown, spinal recess 22 complements and relieves the spinal column of the driver when rested in seat assembly 114. Spinal recess 122 includes energy absorbing material disposed therein. The energy absorbing material may be any suitable non-rigid material conventionally used for energy absorbing and/or cushioning purposes. In this embodiment, the energy absorbing material may be the product having the trade name Sunmate Foam™ manufactured by Dynamic Systems of Leicester, N.C. Grades of the material which may be used may range from medium to semi-rigid grades. Preferably, medium-firm grade of the material is used. Inner layer 114 further includes hip recess 124 formed on bottom portion 20 of seat assembly 14. Hip recess 124 is located proximate the hip region of the driver to complement and relieve the hips of the driver. Hip recess 124 has an energy absorbing material disposed therein. Inner layer 114 further includes left shoulder recess 126 and right shoulder recess 128 formed on left portion 24 and right portion 26, respectively. Each of the shoulder recesses 126, 128 are formed proximate the shoulder region to complement and relieve the shoulder blades of the driver. Each of the shoulder recesses 126, 128 has an energy absorbing material disposed therein. The energy absorbing material may be manually disposed therein to the driver's desire.

In this embodiment, outer layer 111 is made of a six layer carbon composite which may be made by injection molding, compression molding, or by any other conventional means. Other embodiments may include other materials along with greater or less number of layers. This would not fall beyond the scope or spirit of the present invention.

In this embodiment, inner layer 114 is made of a composite material having carbon and an aramid fiber such as the product having the trade name Kevlar™ manufactured by DuPont E. I. De Nemours and Company of Wilmington, Del. Inner layer 114 is formed by any conventional means, such as injection molding or compression molding. In this embodiment, each inner layer 114 is epoxy-tooled from a foam cast of a specific driver. It is to be noted that the material comprising inner layer 114 may vary as well as the manner in which inner layer 114 is formed without falling beyond the scope or spirit of the present invention.

Impact energy material 116 may be any conventional rigid or semi-rigid material used for absorbing energy, e.g., a polyurethane foam may be used with a conventional hollow sphere product. In this embodiment, a two-part polyurethane foam is used with a thirty weight percent and 3.5 mm diameter ceramic hollow sphere product having the trade name Ceramcel. manufactured by CeramTec of Laurens, S.C. The two-part polyurethane foam is a mixture of an isocyanate and a resin. Preferably, the two-part polyurethane foam is made of the product codes "Elastoflex W23430T ISO" and "Elastoflex TF22380R RESIN" manufactured by BASF Corporation of Southfield, Mich. The two-part polyurethane foam has a mix ratio of between 1:1 and 3:1, isocyanate to resin. Preferably, a mix ratio of 1.92:1, isocyanate to resin, is used. A temperature at which the impact energy material 116 is injected is between 65 and 80 degrees Fahrenheit, preferably 72 degrees Fahrenheit. This may be performed by using a mixer blade of between one and five inches, preferably three inches. A speed may be between 2800 and 3500 RPM, preferably at a speed of about 3,100 RPM. The time to complete the injection may vary based on the materials and apparatus used. In this embodiment, the time of injection is ten seconds. Moreover, the density of the impact energy material 116 may also vary between 1 and 3 pounds per cubic foot. Preferably, the density of the two-part polyurethane foam is 1.79 pounds per cubic foot.

Figure 6:
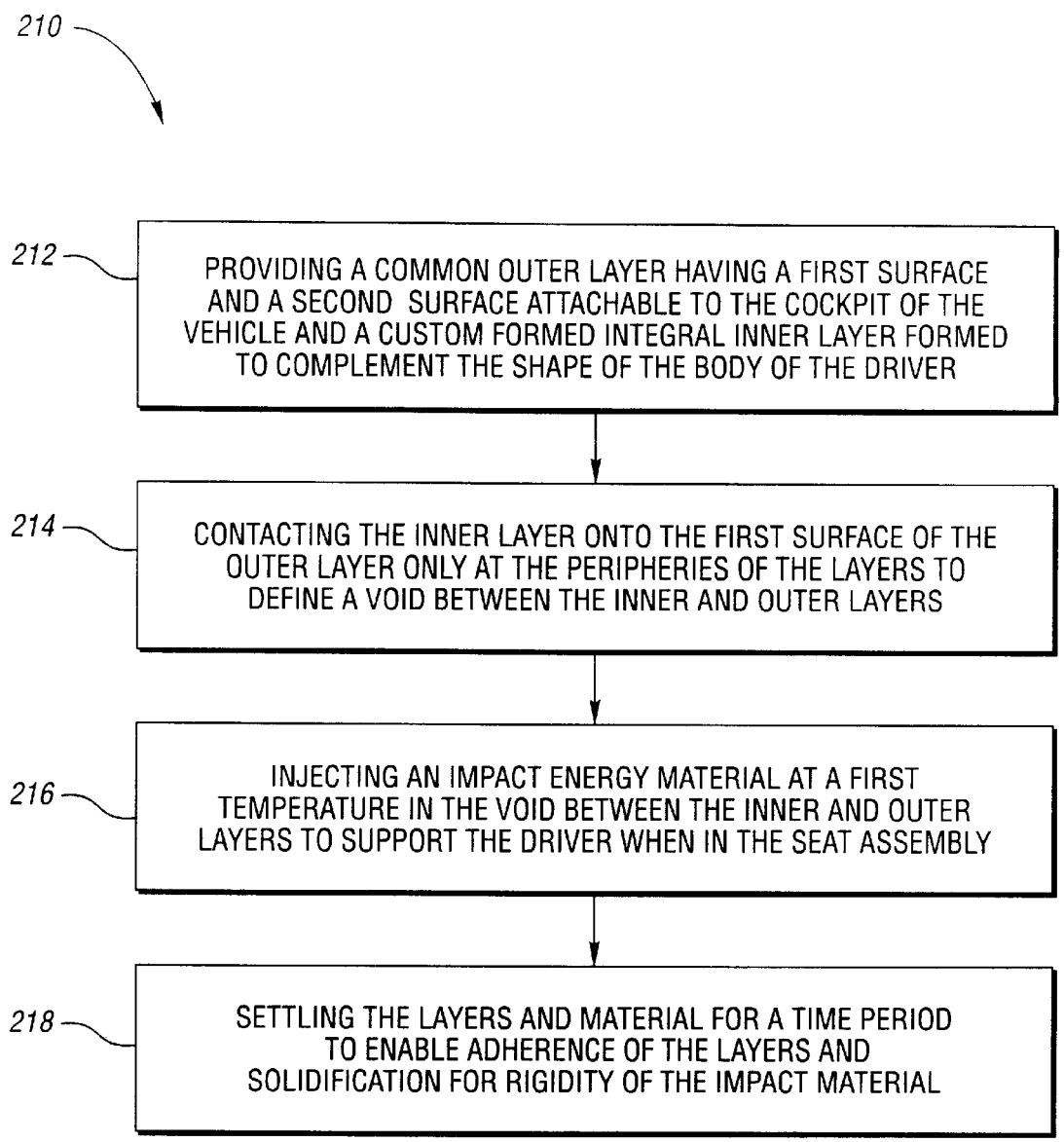
FIG. 6 is a flow chart of one method of manufacturing the seat assembly in accordance with the present invention.

FIG. 6 illustrates a method 210 of manufacturing seat assembly 14 which is attachable to a cockpit of a racing vehicle for a driver of the vehicle. As shown in box 212, common outer layer 111 having first surface 112 and second surface 113 are provided, wherein second surface 113 is attachable to the cockpit of a vehicle. Second surface is formed to be easily press-fit attachable to the cockpit of a vehicle while first surface is formed to receive impact energy material 116 and inner layer 114 such that a driver may be seated therein. Method 210 further includes providing custom-formed integral inner layer 114 formed to complement the shape of the body of the driver, as shown in box 212. As shown in box 214, method 110 further includes contacting inner layer 114 onto first surface 112 of outer layer 111 only at the peripheries of the layers 111, 114 to define a void between the inner and outer layers 111, 114. Layers 111, 114 may be contacted together by any suitable means, such as by positioning the dyes and/or tools (not shown) of layers 111, 114 adjacent each other with the layers 111, 114 respectively intact.

Method 210 further includes injecting impact energy material 116 at a first or ambient temperature in the void between inner and outer layers 111, 114 to support the driver when in the seat assembly in box 216. Impact energy material 116 may be injected by conventional means at a temperature of about 72 degrees Fahrenheit in the void created between inner and outer layers 111, 114. As depicting in box 218, method 210 further includes settling the layers 111, 114 and impact energy material 116 for a time period, preferably one hour, to allow the impact energy material 116 to rise and set. This enables adherence of the layers 111, 114 and solidification of the impact energy material 116 to enable for semi-rigidity thereof. Impact energy material 116 will serve to support the driver when rested in the seat assembly. After settling the material 116, a resulting formed seat is cut by any conventional means to define the bottom portion 20, back portion 22, left portion 24, and right portion 26, as described above and depicted in the figures. Moreover, hinges 58 may be disposed on each edge of each portion to allow the portions to be hingedly connectable to each other as discussed above. The hinges may be disposed on the edges by any suitable way, e.g., high pressure press-fitting.

Figure 7:
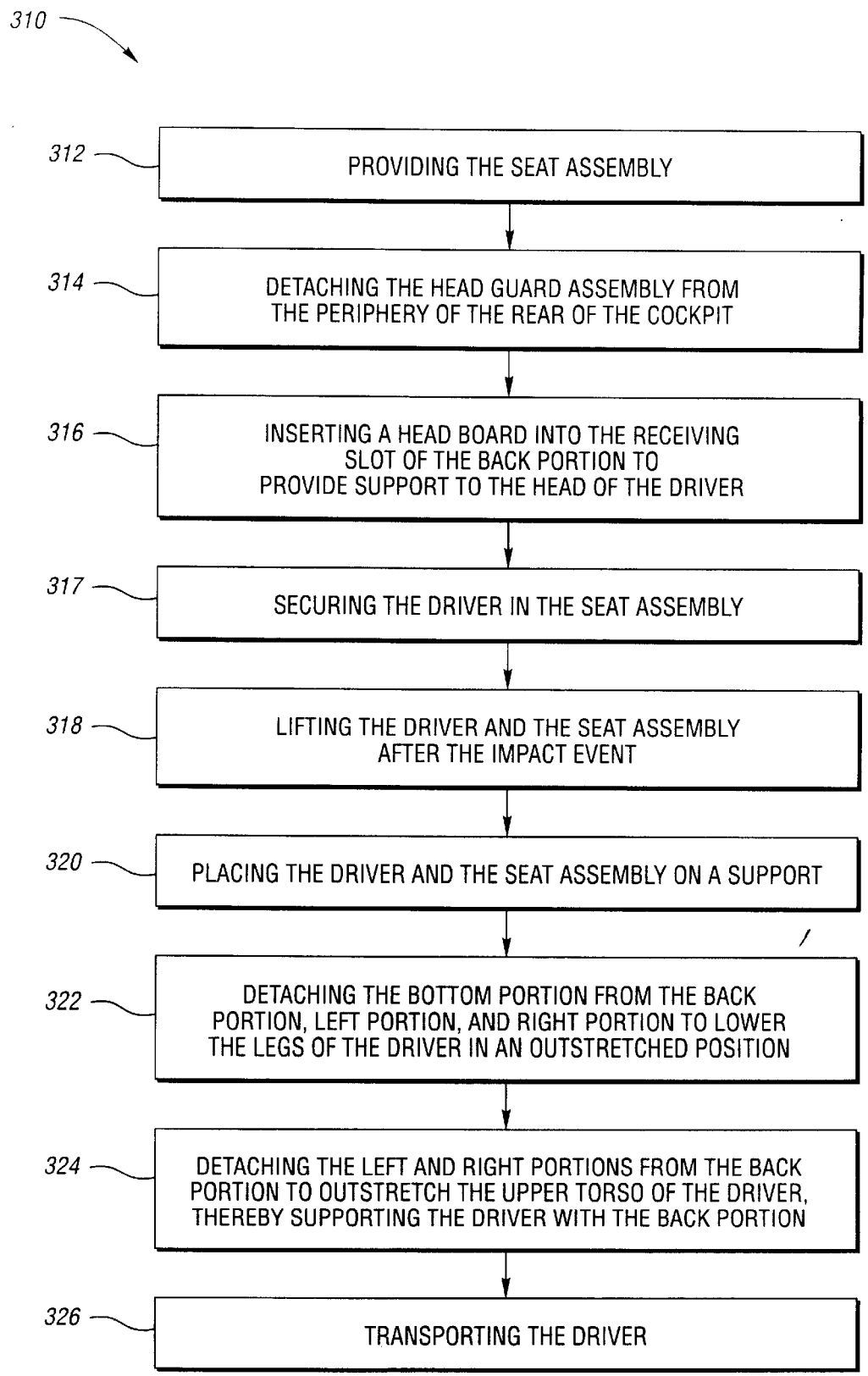
FIG. 7 is a flow chart of one method of extricating a driver and the seat assembly.

In an event of an accident or crash involving injury to the driver, it has been found that safety steps may be taken to reduce the risk of further injury to the driver, especially in a situation where the driver has sustained a spinal injury. FIG. 7 illustrates one method 310 of extricating the driver and seat assembly 14 from a cockpit of a vehicle. As shown in box 312, method 310 includes providing the seat assembly on which the driver is seated. The seat assembly includes a bottom portion with a connectable upper edge, a back portion connected to the upper edge of the bottom portion and having connectable left and right edges, a left portion connected to the upper edge of the bottom portion and connected to the left edge of the back portion, and a right portion connected to the upper edge of the bottom portion and connected to the right edge of the back portion. As shown in box 314 of FIG. 7, method 310 includes detaching head guard assembly 70 from cockpit 12. Each of parts 72, 74, 76 may be detached from the cockpit separately or together, depending on requirements of the incident resulting from the crash. In order to detach each part from each other, chords or rods 64 are pulled from hinges 58. Then, each of the parts 72, 74, 76 may be removed separately from the cockpit. As shown in box 316, method 310 further includes inserting head stabilizing board 34 through receiving slot 32 of back portion 22. As shown in FIG. 2, head stabilizing board 34 slidably inserts into slot 32 and is adjustable according to the body size of the driver. In this embodiment, head stabilizing board 34 includes a cushion attached thereto to provide further support and comfort to the driver. A position of head stabilizing board 34 may be retained inside slot 32 by any suitable means, such as by hook and loop or conventional snap mechanisms. As shown in box 317 of FIG. 7, the driver is then secured onto the seat assembly 14. In this embodiment, this is accomplished by fastening belts 60 with buckles 62 (shown in FIG. 3) and strapping the driver's head on the head stabilizing board 34 by an suitable means. Preferably, during operation of the vehicle, belts 60 and buckles 62 are stowed in the cockpit until after an impact event.

Figure 8:
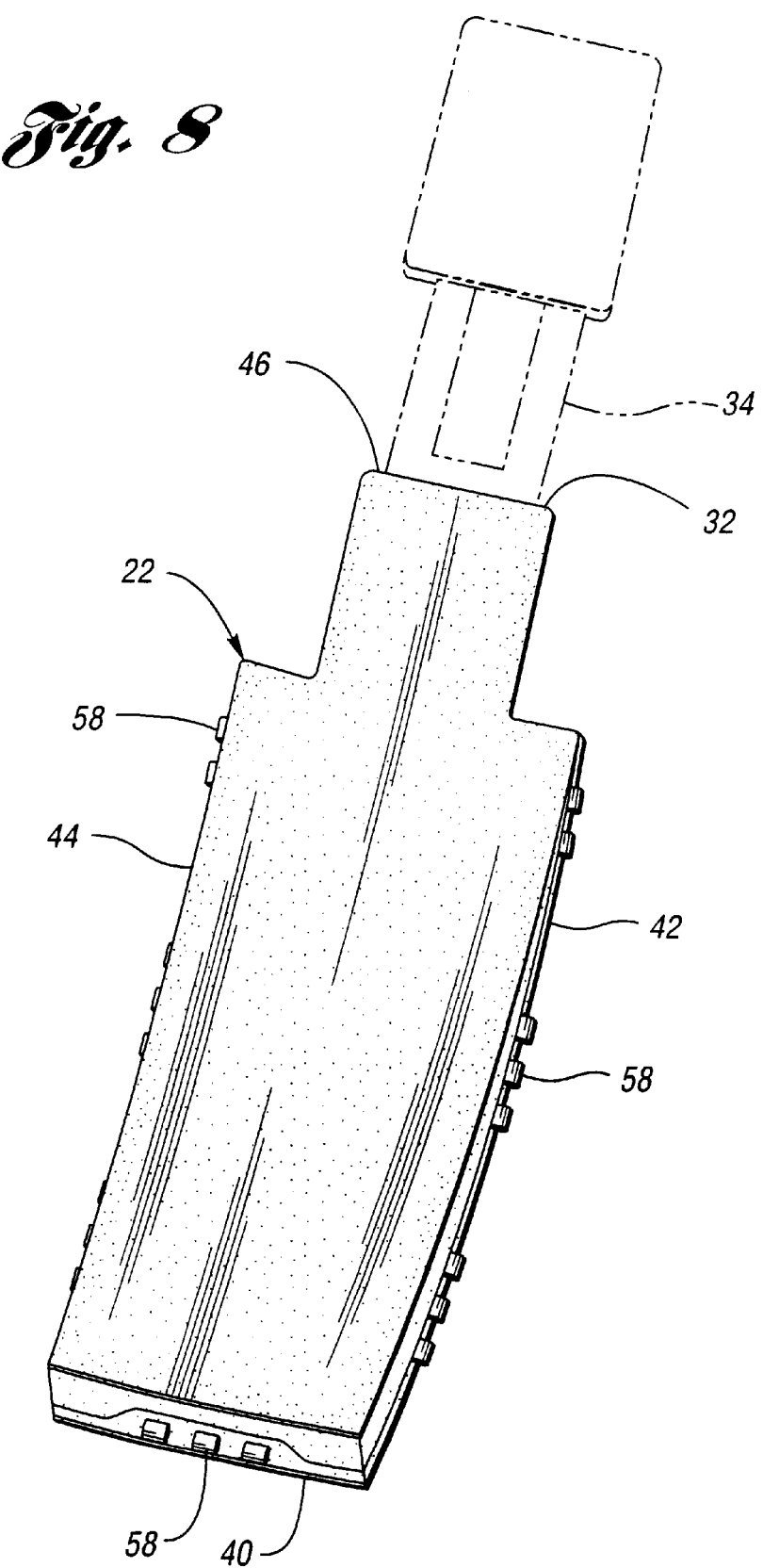
FIG. 8 is an enlarged front view of one embodiment of a back portion in accordance with the present invention.

As shown in box 318, method 310 further includes lifting or removing the driver and seat assembly from the cockpit of the vehicle or from any other surface upon which the seat assembly may rest. As shown in box 320, the driver and seat assembly is moved and placed onto a support, such as a planar support or a conventional vacuum bag. Then, cords 64 are removed from hinges 58 such that portions 20, 22, 24, 26 may be detached from each other. As shown in box 322, bottom portion 20 is detached from the assembly such that the driver's legs may be lowered to a more outstretched position. Left and right portions 24, 26 are then removed from the assembly to provide further outstretching of the upper torso of the driver, in box 324. Remaining with the driver is back portion 22 which provides support to the driver and reduces the risk of further injury of the driver's spine, as shown in FIG. 8. With the driver supported by back portion 22 and head stabilizing board 34, the driver may be transported with reduced risk of further injury, especially to the spinal area, as shown in box 326 of FIG. 7. Thus, the driver may be stabilized more safely.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An extricable seat assembly attachable to a cockpit of a vehicle for a driver of the vehicle, the seat assembly comprising:

a bottom portion to support the lower torso and legs of the driver, the bottom portion having a hingedly connectable upper edge;

a back portion to support the spinal column of the driver, the back portion having a lower edge hingedly and detachably connected to the upper edge of the bottom portion, the back portion having hingedly connectable left and right edges;

a left portion to support the left paraspinal area of the driver, the left portion having a lower edge hingedly and detachably connected to the upper edge of the bottom portion and a right edge hingedly and detachably connected to the left edge of the back portion; and a right portion to support the right paraspinal area of the driver, the right portion having a lower edge hingedly and detachably connected to the upper edge of the bottom portion and a left edge hingedly and detachably connected to the right edge of the back portion, thereby, in an event of an impact, allowing an outstretched position of the driver such that the driver rests substantially coplanar with a support for post-extrication handling of the driver and allowing removal of portions of the seat assembly.

2. The seat assembly of claim 1 wherein at least one of the portions of the seat assembly has an aperture through which a safety belt is received to secure the driver in the seat assembly.

3. The seat assembly of claim 1 wherein the back portion includes a spinal recess centrally formed vertically thereon to complement and relieve the spinal column of the driver, the spinal recess having an energy absorbing material disposed therein.

4. The seat assembly of claim 1 wherein the bottom portion includes a hip recess formed thereon such that it would be proximate a hip region of the driver to complement and relieve the hips of the driver, the hip recess having an energy absorbing material disposed therein.

5. The seat assembly of claim 1 wherein each of the left and right portions include shoulder recesses formed thereon such that it would be proximate a shoulder region to complement and relieve the shoulder blades of the driver, each of the shoulder recesses having an energy absorbing material disposed therein.

6. The seat assembly of claim 1 further comprising a head guard configured to attach about the periphery of the rear of the cockpit for support to the head of the driver, the head guard including:
   a center part for support to the rear of the head, the center part having a lower edge connectable to the cockpit and having hingedly connectable left and right edges;
   a left part for support to the left side of the head, the left part having a lower edge connectable to the cockpit and having a right edge hingedly and detachably connected to the left edge of the center part; and
   a right part for support to the right side of the head, the right part having a lower edge connectable to the cockpit and having a left edge hingedly and detachably connected to the right edge of the center part.

7. The seat assembly of claim 6 wherein each of the hingedly connectable left and right edges of the center part has a hinge disposed thereon.

8. The seat assembly of claim 6 wherein the right edge of the left part includes a hinge disposed thereon.

9. The seat assembly of claim 6 wherein the left edge of the right part includes a hinge disposed thereon.

10. The seat assembly of claim 1 wherein the upper edge of the bottom portion includes a hinge.

11. The seat assembly of claim 10 wherein each of the edges of the back portion includes a hinge.

12. The seat assembly of claim 11 wherein each of the edges of the left portion includes a hinge and each of the edges of the right portion includes a hinge.

13. The seat assembly of claim 12 further comprising:
   a first cord disposed through the hinges of the lower edges of the back, left and right portions and the upper edge of the bottom portion, the first cord hingedly and detachably connecting the lower edge of the back portion, the lower edge of the left portion, and the lower edge of the right portion to the upper edge of the bottom portion;
   a second cord disposed through the hinges of the right edge of the left portion and the left edge of the back portion, the second cord hingedly and detachably connecting the right edge of the left portion to the left edge of the back portion; and
   a third cord disposed through the hinges of the left edge of the right portion and the right edge of the back portion, the third cord hingedly and detachably connecting the left edge of the right portion to the right edge of the back portion.

14. A multi-layered extricable seat assembly attachable to a cockpit of a vehicle and custom fit for a driver of the vehicle, the seat assembly comprising:
   a bottom portion, a back portion, a left portion, and a right portion wherein the portions have
      a common outer layer having a first surface and a second surface attachable to the cockpit of the vehicle, the common outer layer formed to be received in the cockpit;
      a custom-formed integral inner layer formed to complement the shape of the body of the driver, the inner layer being press-fit attached only at its periphery to the first surface of the outer layer, defining a void between the inner and outer layers; and
      an impact energy material disposed in the void between the inner and outer layers, the impact energy material adhering to the inner and outer layers to support the driver when in the seat assembly.

15. The seat assembly of claim 14 wherein the outer layer includes a carbon fiber sheet.

16. The seat assembly of claim 14 wherein the inner layer includes a composite of carbon fibers and an aramid fiber material.

17. The seat assembly of claim 14 wherein the impact energy material includes pourable polyurethane foam.

18. A multi-layered extricable seat assembly attachable to a cockpit of a racing vehicle for a driver of the vehicle, the seat assembly comprising:
   a bottom portion to support the lower torso and legs of the driver, the bottom portion having a hingedly connectable upper edge;
   a back portion to support the spinal column of the driver, the back portion having a lower edge hingedly and detachably connected to the upper edge of the bottom portion, the back portion having hingedly connectable left and right edges;
   a left portion to support the left paraspinal area of the driver, the left portion having a lower edge hingedly and detachably connected to the upper edge of the bottom portion and a right edge hingedly and detachably connected to the left edge of the back portion; and
   a right portion to support the right paraspinal area of the driver, the right portion having a lower edge hingedly and detachably connected to the upper edge of the bottom portion and a left edge hingedly and detachably connected to the right edge of the back portion;
   wherein each portion includes:
      a common outer layer attachable to the cockpit of the racing vehicle, the common outer layer formed to be received in the cockpit of the racing vehicle;
      a custom-formed integral inner layer formed to complement the shape of the body of the driver, the inner layer being press-fit attached only at its periphery to the outer layer defining a void between the inner and outer layers; and
      a liner disposed in the void between the inner and outer layers to support the driver in the seat assembly.

19. The seat assembly of claim 18 wherein the upper edge of the bottom portion includes a hinge.

20. The seat assembly of claim 19 wherein each of the edges of the back portion includes a hinge.

21. The seat assembly of claim 20 wherein each of the edges of the left portion includes a hinge and each of the edges of the right portion includes a hinge.

22. The seat assembly of claim 21 further comprising:
   a first cord disposed through each of the hinges of the lower edges of the back, left, and right portions and disposed through the hinge of the upper edge of the bottom portion, the first cord hingedly and detachably connecting the lower edge of the back portion, the lower edge of the left portion, and the lower edge of the right portion to the upper edge of the bottom portion;

a second cord disposed through the hinges of the right edge of the left portion and the left edge of the back portion, the second cord hingedly and detachably connecting the right edge of the left portion to the left edge of the back portion; and a third cord disposed through the hinges of the left edge of the right portion and the right edge of the back portion, the third cord hingedly and detachably connecting the left edge of the right portion to the right edge of the back portion.

23. The seat assembly of claim 18 further comprising a head guard configured to attach about the periphery of the rear of the cockpit for support to the head of the driver, the head guard including:

a center part for support to the rear of the head, the center part having a lower edge connectable to the cockpit and having hingedly connectable left and right edges;

a left part for support to the left side of the head, the left part having a lower edge connectable to the cockpit and having a right edge hingedly and detachably connected to the left edge of the center part; and a right part for support to the right side of the head, the right part having a lower edge connectable to the cockpit and having a left edge hingedly and detachably connected to the right edge of the center part.

24. The seat assembly of claim 18 wherein each of the portions of the seat assembly has a slot formed thereon through which a safety belt is received to secure the driver in the seat assembly.

25. The seat assembly of claim 18 wherein the back portion includes a spinal recess centrally formed vertically thereon to complement and relieve the spinal column of the driver.

26. The seat assembly of claim 18 wherein the bottom portion includes a hip recess formed thereon such that it would be proximate a hip region of the driver to complement and relieve the hips of the driver.

27. The seat assembly of claim 18 wherein each of the left and right portions include shoulder recesses formed thereon proximate a shoulder region of the driver to complement and relieve the shoulder blades of the driver.

28. The seat assembly of claim 18 wherein the back portion further includes an upper portion having a receiving slot through which a slidable head stabilizing board is inserted for further head support to the driver, the slidable head stabilizing board being adjustable in accordance with the upper torso length of the driver.

29. A method of extricating a driver on an extricable seat assembly of a cockpit of a vehicle after an impact event, the method comprising:

providing the seat assembly on which the driver is seated, the seat assembly including a bottom portion with a connectable upper edge, a back portion connected to the upper edge of the bottom portion and having connectable left and right edges, a left portion connected to the upper edge of the bottom portion and connected to the left edge of the back portion, and a right portion connected to the upper edge of the bottom portion and connected to the right edge of the back portion;

lifting the driver and the seat assembly after the impact event;

placing the driver and the seat assembly on a support;

detaching the bottom portion from the back portion, left portion, and right portion to lower the legs of the driver in an outstretched position; and detaching the left and right portions from the back portion to outstretch the upper torso of the driver, thereby supporting the driver with the back portion.

30. The method of claim 29 wherein the back portion further includes an upper edge having a receiving slot through which a slidable head stabilizing board is disposed to provide support to the head of the driver during extrication of the driver and the seat assembly.

31. The method of claim 30 wherein the seat assembly further includes a head guard configured to attach about the periphery of the rear of the cockpit for support to the head of the driver.

32. The method of claim 30 further comprising:

detaching the head guard assembly from the periphery of the rear of the cockpit to accommodate lifting the driver and the seat assembly;

inserting a head stabilizing board into the receiving slot of the back portion to provide support to the head of the driver;

securing the driver in the seat assembly before the step of lifting; and transporting the driver after detaching the left and right portions from the back portion.

33. A multi-layered extricable seat assembly attachable to a cockpit of a vehicle and custom fit for a driver of the vehicle, the seat assembly comprising:

a common outer layer having a first surface and a second surface attachable to the cockpit of the vehicle, the common outer layer formed to be received in the cockpit;

a custom-formed integral inner layer formed to complement the shape of the body of the driver, the inner layer being press-fit attached only at its periphery to the first surface of the outer layer, defining a void between the inner and outer layers; and an impact energy material disposed in the void between the inner and outer layers, the impact energy material adhering to the inner and outer layers to support the driver when in the seat assembly wherein the outer layer includes a carbon fiber sheet.

34. The seat assembly of claim 33 wherein the inner layer includes a composite of carbon fibers and an aramid fiber material.

* * * * *